(12) United States Patent
Osborne et al.

(10) Patent No.: US 8,892,892 B2
(45) Date of Patent: Nov. 18, 2014

(54) SYSTEM FOR ENABLING DIGITAL SIGNATURE AUDITING

(75) Inventors: Michael Charles Osborne, Zurich (CH); Tamas Visegrady, Zurich (CH)

(73) Assignee: International Business Machines Corporation, Armonk, NY (US)

(*) Notice: Subject to any disclaimer, the term of this patent is extended or adjusted under 35 U.S.C. 154(b) by 68 days.

(21) Appl. No.: 13/420,705

(22) Filed: Mar. 15, 2012

(65) Prior Publication Data

US 2012/0239935 A1 Sep. 20, 2012

(30) Foreign Application Priority Data

Mar. 16, 2011 (EP) ..................................... 11158512

(51) Int. Cl.
*G06F 21/00* (2013.01)
*H04L 9/32* (2006.01)

(52) U.S. Cl.
CPC ........... *H04L 9/3247* (2013.01); *H04L 2209/38* (2013.01)
USPC ............................. 713/175; 713/150; 726/10

(58) Field of Classification Search
CPC ...... H04L 9/32; H04L 9/3247; H04L 2209/38
USPC .................................................. 713/176, 175
See application file for complete search history.

(56) References Cited

U.S. PATENT DOCUMENTS

| | | | |
|---|---|---|---|
| 6,898,709 B1* | 5/2005 | Teppler | 713/178 |
| 7,716,488 B2* | 5/2010 | Yagawa | 713/178 |
| 7,926,096 B2* | 4/2011 | Ali et al. | 726/9 |
| 8,422,682 B2 | 4/2013 | Ortiz Cornet et al. | |
| 2005/0138361 A1* | 6/2005 | Saarepera et al. | 713/156 |
| 2006/0059346 A1* | 3/2006 | Sherman et al. | 713/175 |
| 2007/0226807 A1* | 9/2007 | Ginter et al. | 726/27 |
| 2009/0158043 A1* | 6/2009 | Boyer et al. | 713/176 |

FOREIGN PATENT DOCUMENTS

| | | | |
|---|---|---|---|
| JP | 2006-343790 A | 12/2006 | |
| JP | 2007-82043 A | 3/2007 | |

OTHER PUBLICATIONS

CEN Information Society Standardization System, CWA 14167-4: "Cryptographic Module for CSP Signing Operations Protection Profile," Oct. 2003. Version: 0.28. CEN/ISSS Electronic Signature (E-SIGN) Workshop.
Rosario Gennaro and Pankaj Rohatgi, "How to sign digital stream," Information and Computation, 165(1):100-116, 2001.

(Continued)

*Primary Examiner* — Yogesh Paliwal
(74) *Attorney, Agent, or Firm* — Derek S. Jennings; Patent Mining Works, LLC

(57) ABSTRACT

A computer method, computer system, and article for enabling digital signature auditing. The method includes the steps of: receiving at least one signature request issued by at least one application, forwarding a first data corresponding to the received at least one signature request to at least one signing entity for subsequent signature of the first data, storing an updated system state that is computed using a function of: i) a reference system state and ii) a second data corresponding to the received at least one signature request, where the reference system state and the updated system state attest to the at least one signature request, and repeating the above steps, using the updated system state as a new reference system state, where the steps of the method are executed at a server of a computerized system.

1 Claim, 6 Drawing Sheets

(56) References Cited

OTHER PUBLICATIONS

Emil Gurevitch, "Providing a tamper-evident layer for logs using secure hardware," Academic dissertation, IMM-B.Eng.-2010-34, 2010, Technical University of Denmark (DTU).

Jason E. Holt, "Logcrypt: forward security and public verification for secure audit logs," In ACSW Frontiers '06: Proceedings of the 2006 Australasian workshops on Grid computing and e-research, pp. 203-211, Australian Computer Society, Inc., 2006.

Wikipedia contributors. "Secure cryptoprocessor." Wikipedia, The Free Encyclopedia. Wikipedia, The Free Encyclopedia, Nov. 29, 2010. Web. Feb. 23, 2011.

\* cited by examiner

SYSTEM FOR ENABLING DIGITAL SIGNATURE AUDITING

CROSS-REFERENCE TO RELATED APPLICATION

This application claims priority under 35 U.S.C. §119 from European Patent Application No. 11158512.1 filed one Mar. 16, 2011, the entire contents of which are incorporated herein by reference.

BACKGROUND OF THE INVENTION

1. Field of the Invention

The present invention relates to computerized methods and systems for enabling digital signature auditing. More particularly, the present invention relates to computerized methods and systems involving a server communicating with a number of concurrent applications that requests timestamps for application-relevant events.

2. Related Art

A secure cryptoprocessor is known to be a dedicated chip or microprocessor, carrying out cryptographic operations, mostly embedded in a packaging with various physical security measures, and providing a degree of tamper resistance.

For example, smartcards are well-known forms of secure cryptoprocessors, although more complex cryptoprocessors are widely deployed in sensitive systems such as Automated teller machines, see e.g., Wikipedia contributors. "Secure cryptoprocessor." Wikipedia, The Free Encyclopedia. Wikipedia, The Free Encyclopedia, 29 Nov. 2010. Web. 23 Feb. 2011.

One skilled in the art also knows hardware security modules (HSM), i.e., a type of secure cryptoprocessor for managing digital keys, accelerating cryptoprocesses in terms of digital signings and for providing strong authentication to access critical keys for server applications.

Such modules are physical devices traditionally in the form of plug-in cards or external TCP/IP security devices, which can be attached directly to a computer (server or general purpose computer), see e.g., Wikipedia contributors. "Hardware security module." Wikipedia, The Free Encyclopedia. Wikipedia, The Free Encyclopedia, 8 Feb. 2011. Web. 23 Feb. 2011.

HSMs can notably be used to deliver digitally signed data such as timestamps. Digital signature generally means data appended to, or a cryptographic transformation of, a data unit that allows a recipient of the data unit to prove the source and integrity of the data unit and protect against forgery e.g. by the recipient, see e.g., CEN Information Society Standardization System. CWA 14167-4: Cryptographic Module for CSP Signing Operations Protection Profile, October 2003. Version: 0.28. CEN/ISSS Electronic Signature (E-SIGN) Workshop (hereinafter "CEN").

One skilled in the art further knows specifications for cryptographic modules for certification-service-provider signing operations. Such cryptographic modules provide identification authentication, access control and audit for users of its services, see e.g., CEN.

Also, one skilled in the art knows the system "Logcrypt", which provides strong cryptographic assurances that data stored by a logging facility before a system compromise cannot be modified after the compromise without detection. See Jason E. Holt. Logcrypt: forward security and public verification for secure audit logs, In ACSW Frontiers '06: Proceedings of the 2006 Australasian workshops on Grid computing and e-research, pages 203-211. Australian Computer Society, Inc., 2006 (herein after "Holt"). There are other implementations based on the nonmalleable properties of hash chains.

Information and Computation, 165(1): 100-116, 2001 discloses "How to Sign Digital Streams" by Rosario Gennaro and Pankaj Rohtagi, hereinafter (Gennaro) and Pankaj Rohatgi.

IMM-B.Eng.-2010-34, 2010, Technical University of Demark discloses "Providing a tamper-evident layer for logs using secure hardware," which is an Academic Dissertation by Emil Gurevitch.

BRIEF SUMMARY OF THE INVENTION

One aspect of the invention includes a method for enabling digital signature auditing, implemented in a computerized system comprising a server communicating with applications. The method includes the steps of: receiving at least one signature request issued by at least one of the applications, forwarding a first data corresponding to the received at least one signature request to at least one signing entity for subsequent signature of the first data, storing an updated system state that is computed using a function of: i) a reference system state and ii) a second data corresponding to the received at least one signature request, wherein the reference system state and the updated system state attest to the at least one signature request, and repeating the above steps, using the updated system state as a new reference system state, where the steps of the method are executed at the server of the computerized system.

Another aspect of the invention includes a computerized system that includes a server adapted for communicating with applications and signing entities, where the server includes the following computer hardware modules: a receiving module for receiving at least one signature request issued by at least one of the applications, a forwarding module for forwarding a first data corresponding to the received at least one signature request to at least one signing entity for subsequent signature of the first data, and a storing module for storing an updated system state that is computed using a function of: i) a reference system state and ii) a second data corresponding to the received at least one signature request, wherein the reference system state and the updated system state attest to the at least one signature request.

Yet another aspect of the invention includes a non-transitory article of manufacture tangibly embodying computer readable instructions, which when executed on a computer device cause the computer device to execute the steps of a method for enabling digital signature auditing of a server communicating with applications. The method includes the steps of: receiving at least one signature request issued by at least one of the applications, forwarding a first data corresponding to the received at least one signature request to at least one signing entity for subsequent signature of the first data, storing an updated system state that is computed using a function of: i) a reference system state and ii) a second data corresponding to the received at least one signature request, wherein the reference system state and the updated system state attest to the at least one signature request, and repeating the above steps, using the updated system state as a new reference system state.

DETAILED DESCRIPTION OF THE PREFERRED EMBODIMENTS

Figure 1:
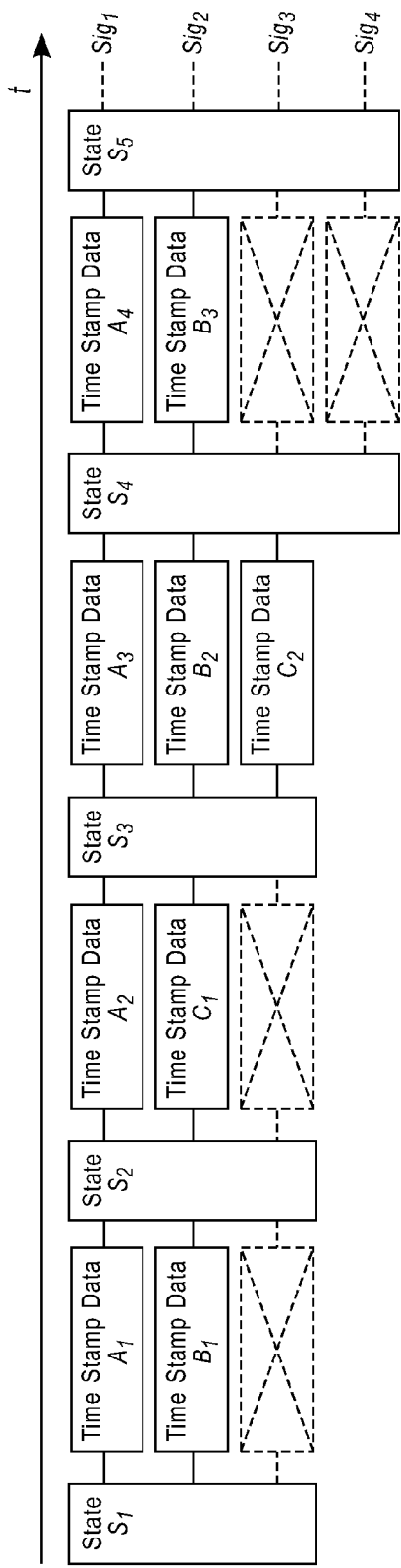
FIG. 1 illustrates a system-level view of issued digital events such as timestamps, as returned from signing entities and aggregated into a sequence of system-level states, according to an embodiment of the present invention.

First, general aspects of methods according to embodiments of the invention are discussed, together with high-level variants thereof (section 1). Next, in section 2, more specific embodiments are described.

In reference to FIGS. 1-6, present methods are typically implemented in a computerized system 1, comprising a server 10 communicating with a set 30 of applications A, B, C, ..., i.e., sending requests to and receiving updates from the server. The server 10 further acts as an interface between the applications and a set 20 of signing entities $Sig_m$, typically HSMs, that deliver digital signatures such as timestamps, as known per se. Thus, system 1 primarily contains the server 10, e.g., a timestamp server. System 1 can also be regarded as "comprising" the applications and/or the signing entities, as well as other entities/components such as a certificate authority 40, signer certificates 50, system state chain 15, etc., which are described herein.

The following steps are implemented, as described from the server viewpoint (emphasis put on the flowchart of FIG. 6):

Step S13: application-related data $a_i, b_i, c_i, \ldots$ such as application states or application-relevant events, issued by respective applications A, B, C (step S31) are received at the server. Such data $a_i, b_i, c_i, \ldots$ generally denote activities or events of the applications for which signature is requested; they are interpreted as signature requests by the server. How such requests can precisely be handled at the server will be described later.

Step S14: the server forwards first data (call it $D_{1,n}$), which correspond to the received signature requests, to the set 20 of signing entities $Sig_m$ (or "signers" for short) for subsequent signature (step S21). How the server can precisely dispatch the signature requests to signers shall be explored later.

Step S15, an updated system state $s_{n+1}$ is computed using a function $f$, typically non-reversible, i.e., $s_{n+1} = f(s_n, D_{2,n})$ and subsequently instructed to be stored by the server on some convenient location, step S16. The function $f$ takes as arguments:

A reference system state $s_n$, typically the state previously computed, which serves as reference state for a current cycle n, see step S12, and second data (generally denoted by $D_{2,n}$), which correspond to the signature requests received and forwarded to signers during that same cycle.

While $D_{1,n}$ and $D_{2,n}$ both are data corresponding to the received requests (i.e., each of $D_{1,n}$ and $D_{2,n}$ is logically related to the requests), they do not need to be the same data. As we shall see, $D_{2,n}$ can correspond to or even comprise:

The application-relevant data $a_i, b_i, c_i, \ldots$ as received at the server during the current cycle n; and/or data $A_i, B_i, C_i, \ldots$, corresponding to $a_i, b_i, c_i, \ldots$, where $A_i, B_i, C_i, \ldots$ notably comprise timestamps as returned by the signing entities (Step S22) within cycle n. Interestingly, if $A_i, B_i, C_i, \ldots$ are not included, then the update of system states can occur in parallel with signing. Yet, including $A_i, B_i, C_i, \ldots$ provide higher-level assurance by aggregating the issued signatures, which can be considered more valuable than the signed data.

Finally, the afore mentioned steps (S12-S16) are repeated, taking the updated system state $s_{n+1}$ as a new reference state for the computation of subsequent updates to the system states.

A sequence $\{\ldots, s_n, \ldots\}$ of system states is accordingly obtained, which attests to the signature requests. In particular, two consecutive (or at least succeeding) states, i.e., $s_n$ and $s_{n+1} = f(s_n, D_{2,n})$, attest to $D_{2,n}$. The whole sequence keeps track of the history of the signature requests. Such a system state update process draws a system level sequence (see e.g., $s_{1-4}$ in FIG. 1) which offers integrity guarantee, as to be later probed during an audit process, step S41.

Preferably, as evoked above, the server can use data returned from the signers (step S22) in response to $D_{1,n}$ to update the system state. Returned data comprise third data $D_{3,n} = A_i, B_i, C_i, \ldots$ such as timestamps (and possibly additional trusted time data $t_i$) logically related to $D_{1,n}$.

In practice, the responses returned are the timestamps. The latter are preferably included in the update process e.g., for high assurance environments. The timestamps returned can retain some reference to the request which originated it, or events $a_i, b_i, c_i, \ldots$ contained in or referred to in that request, etc.

Thus, the requests as such can be discarded. Yet, it can be simpler to gather each relevant piece of data (requests or application-related events+timestamps).

Several cases can accordingly be distinguished:

(i) $s_{n+1} = f(s_n, a_i, b_i, c_i, \ldots)$, i.e., system states are updated based on a previous state $s_n$ and the signature requests (or related data) only, which allows for parallelization, to some extent;

(ii) $s_{n+1} = f(s_n, a_i, b_i, c_i, \ldots A_i, B_i, C_i, \ldots)$, i.e., the update process further takes into account responses returned from the signers; or (iii) $s_{n+1} = f(s_n, A_i(a_i), B_i(b_i), C_i(c_i), \ldots)$, equivalently, the responses returned from the signers retain some reference to the requests, such that application-relevant events (as initially received at the server) need not be retained in the update process;

(iv) $s_{n+1} = f(s_n, A_i, B_i, C_i, \ldots)$, here the requests as received at the server are discarded from the update process but it is assumed that $A_i, B_i, C_i, \ldots$ can be otherwise mapped onto $a_i, b_i, c_i, \ldots$;

(v) Etc.

For reasons that shall be given in section 2, cases (iii) or (iv) above are preferred.

Next, an unambiguous dispatch process can preferably retain at most one signature request $a_i, b_i, c_i$ per requesting application A, B, C within a same cycle of update $s_n$-$s_{n+1}$. This shall be developed later.

Furthermore, as illustrated in FIG. 1, the system state update process preferably encodes data pertaining to concurrent applications. Namely, a state $s_{n+1}$ is obtained based on second data $D_{2,n}$, which likely correspond to requests from two distinct applications or more. For example, as illustrated in FIG. 1, $s_2$ is obtained from $s_1$ using notably $A_1$ and $B_2$, that is, data corresponding to application data $a_1$, $b_2$, i.e., to applications A and B. Similarly, $s_3$ is obtained from $s_2$ using $A_2$ and $C_1$, etc. The meaning of crossed-out boxes shall be explained later.

Additional variants can also be contemplated where the system updates are structured as vectors, i.e., $s_{n+1} = \{s_{A,n+1}, s_{B,n+1}, s_{C,n+1} \ldots \}$, whose components correspond to respective application A, B, C, ... (which anyway is the case when only one application interacts with the server). Such variants can be suited for systems with a constant or limited number of applications. They are however not preferred when the server interacts with changeable client applications, in particular when the server is subjected to rogue applications R, as the system state evolution $s_{R,n+1} = f(s_{R,n}, \ldots)$ can be more, perhaps too predictable. Such variants can for instance be noted:

(vi) $s_{n+1} = \{s_{A,n+1}, s_{B,n+1}, s_{C,n+1}, \ldots \} = \{f(s_{A,n}, a_i, \ldots), f(s_{B,n}, b_i, \ldots), f(s_{C,n}, C_i, \ldots), \ldots \}$ (vii) $s_{n+1} = \{s_{A,n+1}, s_{B,n+1}, s_{C,n+1}, \ldots \} = \{f(s_{A,n}, A_i, \ldots), f(s_{B,n}, B_i, \ldots), f(s_{C,n}, C_i, \ldots), \ldots \}$ (viii) Etc.

Similarly, the system updates can be structured as vectors $s_{n+1} = \{\ldots, s_{m,n+1}, s_{m+1,n+1}, s_{m+2,n+1}, \ldots \}$, each component corresponding to a particular signer m.

Incidentally, still other variants can be contemplated, where function $f$ takes any previously computed state $s_{n-p}$ or a combination thereof $\{s_{n-p}, s_{n-q}\}$ as arguments, in addition to $D_{2,n}$, e.g., $s_{n+1} = f(s_{n-1}, D_{2,n})$. Thus, the reference state is not necessarily the system state just previously computed. In all cases, a scheme is achieved which allows for keeping track of history of application requests.

Next, storing the updated states can involve aggregating the second data $D_{2,n}$ (step S16) into a sequence 15 of system states $\{s_n, s_{n+1}\}$. A typical resulting structure can reflect that of FIG. 1. For instance, a simple aggregation scheme consists of interlacing the second data into the sequence of states, which can be noted $\{s_n, \{a_i, b_i, \ldots\}, s_{n+1}\}$, or $\{s_n, \{a_i, b_i, \ldots\}, \{A_i, B_i, \ldots\}, s_{n+1}\}$, etc., depending on the computation scheme retained.

The sequence is suitably stored, e.g., encrypted, and can later be made available for an auditing entity 40. If needed, the server can provide access to the sequence upon request, step S18. In variants, the auditing entity 40 has access to the stored sequence 15.

At present, request assignments to signers are discussed in more details. Preferably, forwarding the first data (step S14) comprises dispatching data subsets corresponding to respective signature requests $a_i$, $b_i$, ... as received at step S13, to respective signers for subsequent signature.

An example is the following, which reflects FIG. 1: a reference system state $s_1$ is first identified (see also FIG. 6, step S12), signature requests $\{a_1, b_2\}$ are received (also FIG. 6, step S13), and corresponding Data are sent for signature, steps S14, S21.

More precisely, first and second data subsets corresponding respectively to signature requests $a_1$ and $b_1$ are assigned to signers $Sig_1$ and $Sig_2$, respectively, for subsequent signature. Signers $Sig_1$ and $Sig_2$ return corresponding timestamp data $\{A_1, B_1\}$, step S22, which can themselves be used (in addition to/instead of $a_1$, $b_1$) to advance the system state to $s_2$, etc.

Accordingly, references $s_1$-$s_5$ in FIG. 1 denote successive system states. A horizontal line corresponds to a given signer. Signers act in parallel. Thus:

$A_1$ denotes a first timestamp as returned from signer $Sig_1$ and corresponds to a first application state/event $a_1$ of application A.

Similarly $B_1$ corresponds to a first timestamp for first application data $b_1$ of application B, except that data corresponding to $b_1$ were dispatched to signer $Sig_2$.

$A_2$ corresponds to a second timestamp as returned from $Sig_1$ for application A. That $Sig_1$ appears as dedicated to application A is accidental, although embodiments can be contemplated, in principle, where signers are assigned to dedicated applications.

$C_1$ corresponds to a first timestamp returned from the second signer $Sig_2$ for application C, etc.

When to dispatch is decided at the server, e.g., based on timing constraints such as quantized time periods. For example, the server buffers the signature requests $a_i$, $b_i$, $c_i$ being received, while previously forwarded requests are being signed at the signers $Sig_{1-4}$. This shall be re-discussed later in reference to FIG. 5. Other variants can be contemplated. For example, when a predetermined number of requests received is reached, the server forwards the requests to the signers.

Figure 2:
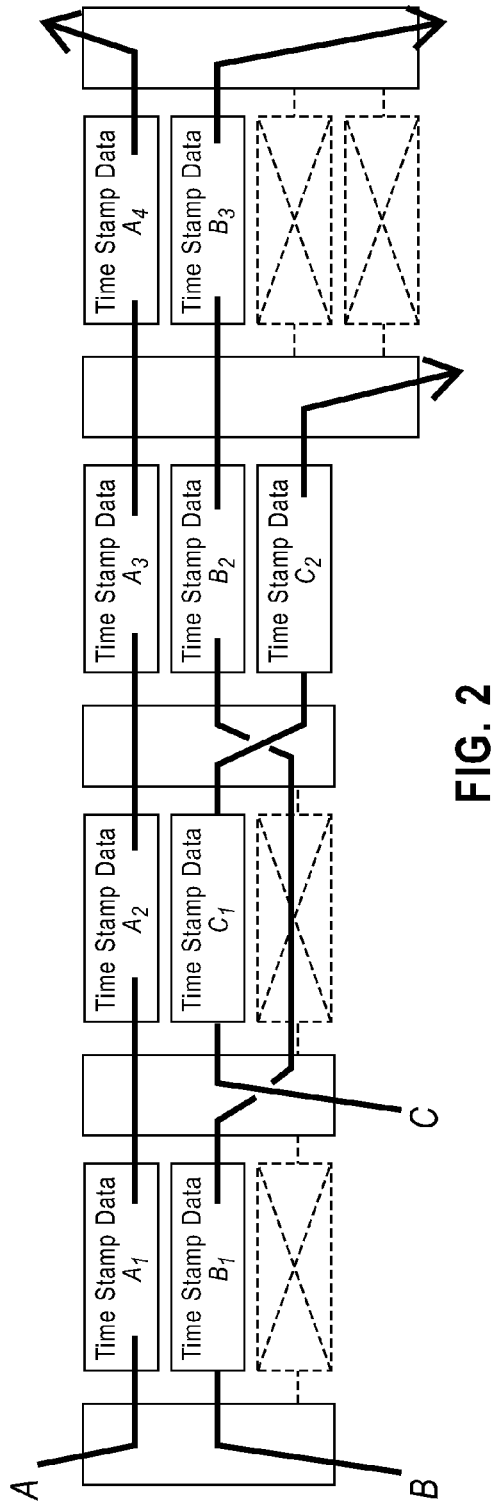
FIG. 2 illustrates application-specific state chains, within the state sequence of FIG. 1 according to an embodiment of the present invention.
Figure 3:
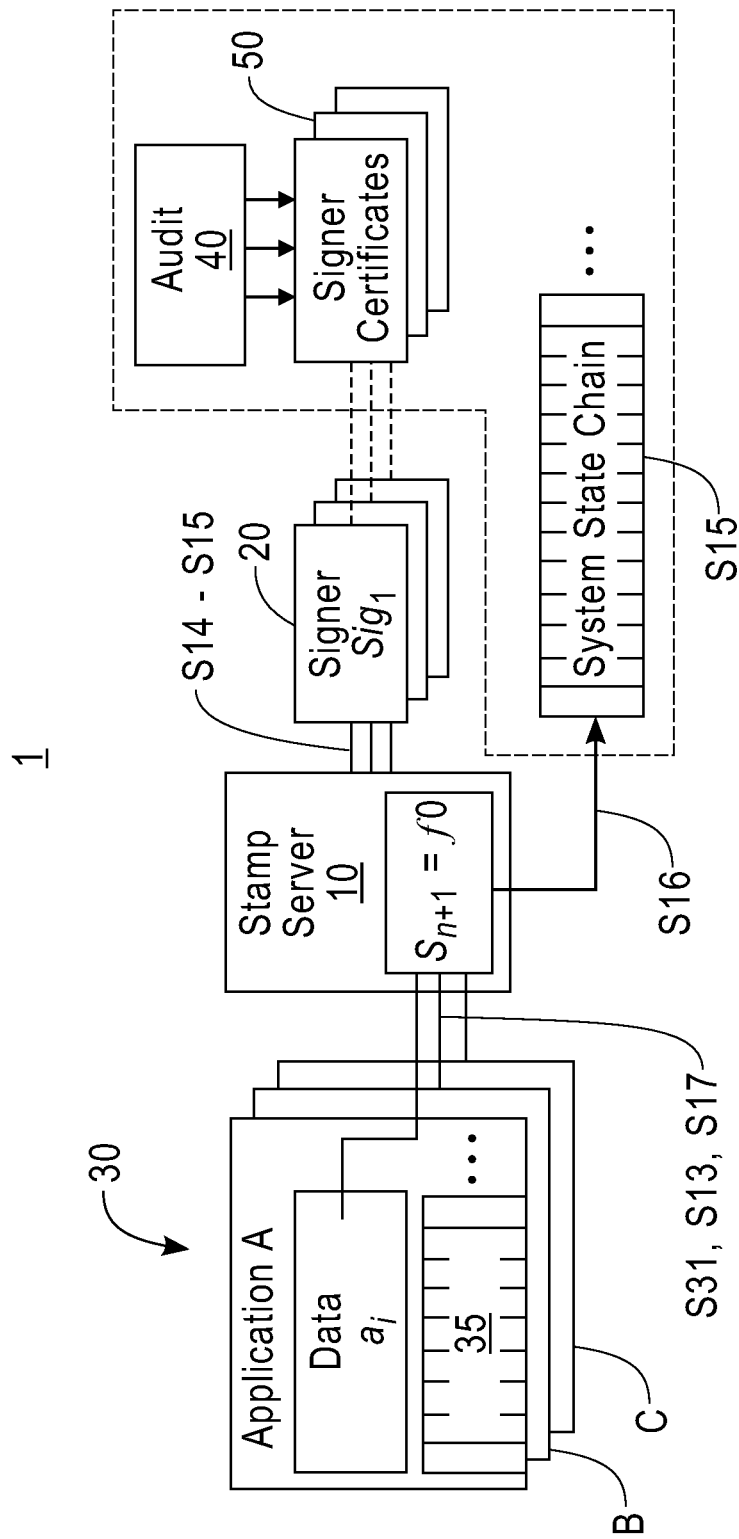
FIG. 3 illustrates various components of a computerized system for enabling digital signature auditing according to an embodiment of the present invention.

FIG. 2 illustrates state chain paths corresponding to FIG. 1, yet from the viewpoint of applications. As depicted in FIG. 3, applications can maintain their own state chain 35, or not. In this respect, embodiments allows for applications to query/check their own states.

Typically, when desired, an application can query the server, e.g., as to a given reference application state, timestamps or, even, a system state. In response, the server can provide any relevant answer simply by inspection of the aggregated data 15. For example, the server can compute and returns to the application an updated system state, obtained using a similar scheme as discussed earlier, i.e., reflecting steps S13-15, S17 of FIG. 6.

Interestingly, the system does not need to persistently store application data, beyond those data needed in the system state chain 15. The latter can be given a prefix, simplified format using identifiers pointing to application-relevant data stored elsewhere, whence scalability.

Additional details will now be provided in reference to more specific embodiments.

In the following, specific embodiments of methods and systems for enabling digital signature auditing are described in reference to FIGS. 1-4. In particular, a signing service such as timestamping service is described which combines elements of central and distributed systems and can generate digitally signatures such as timestamps attesting to application data, e.g., application-relevant events.

In addition to standalone digital signatures (including timestamps), such a system can support a large number of applications, allowing each to track a single-directional sequence of evolving system states, in a way that prevents later modification of the entire event sequence (including the global and individual application system states). Such sequences can be used as high-assurance, cryptographically secure audit logs, to prove the integrity and authenticity of entire sequences of events, not just individual timestamps.

Such a system also provides a system-level aggregate state sequence, allowing system-wide audits under the same integrity guarantees. The combined log allows this system to give strong proofs for the history of connected client applications. The system can transparently change the number of backend signing devices, providing an arbitrarily large signing throughput.

As discussed earlier, the system comprises the server 10, acting as a central dispatcher coordinating request queues, serving a set of lower-privilege applications/jobs, and equipped with the following components (see e.g., FIG. 3):

1) A sequence of system states ("state chain", $s_1$-$s_5$ in FIG. 1), advanced through one-way functions in a non-reversible fashion, aggregating relevant information in a cryptographically strong fashion. Such functions are known per se. As explained earlier, state $s_{n+1}$ is computed based on a previous state $s_p$ ($p \leq n$), data corresponding to the received requests (such as data corresponding to responses from the signers). Typical implementations uses "hash chains" or similar one-way sequences, infeasible to forge (insert or remove elements).

2) A dispatcher, which orders timestamp requests from its input queue (in an unambiguous fashion), dispatches to an arbitrary number of signers $Sig_n$, and routes corresponding responses back to the requesting applications. The dispatcher also quantizes time, creating "timestamp(-issuing) cycles" (FIG. 5), delaying requests (see $A_1 \ldots C_2$ in FIG. 1) which arrive while previously dispatched requests are being signed.

Timestamp cycles quantize time down to the resolution of a given, e.g., worst-case, signing latency. We assume that signing latency is sufficiently low not to impact the dispatcher. This assumes adequate signing capability of the signing entities.

3) The dispatcher (the server) maintains a set 20 of suitable signers Sig1-n, such as signer hardware security modules (HSMs) or equivalent high-assurance signing devices, see e.g., CEN. For example, a newly inserted backend signer $s_5$ can be activated (S11, FIG. 6) when $s_4$ is reached in FIG. 1. In variants, signers also maintain their internal clocks, and insert trusted time values into timestamp structures, requiring no trust in the clock of the host itself.

The dispatcher can provide quality-of-service guarantees, priority levels, or other known queue management features. Such details are not further discussed here, as it is assumed that a central queue is used, for simplicity.

4) A set 30 of one or more applications A, B, C, . . . , each maintaining its own application-level states $a_i$, $b_i$, $c_i$, . . . forming a logical chain of events 35. Applications maintain their own state and form a logical chain based on updates to that state (such as through $A_1$-$A_4$ or $B_1$-$B_3$ in FIG. 1 or 2).

Since applications order requests unambiguously, they preferably do not submit multiple events from the same application state (which can be ambiguous, branching the chain, and therefore invalid).

Yet, implementation dependent responses can be contemplated for such invalid call sequences. An adequate response is for instance to process a first such request and ignore subsequent events from the same application. In other words, at most one signature request per requesting application is retained within a current cycle for the computation of a new system state.

Accordingly, application-level data $a_i$, $b_i$, $c_i$, . . . denote application states as well as any application-level event. Other system-specific reactions can be defined.

5) Additional applications can be provided in communication with the server, with requirements for timestamps, but not maintaining a logical sequence of states. Such applications are traditional timestamp-users, maintaining digitally signed timestamps as proof of possession, but not constructing evidence of relative ordering. Note that real-time clock differences can imply inexact ordering even in the presence of timestamps, if there are multiple signers.

In the specific embodiments discussed now, the system manages traditional timestamp users as a side effect: for the present purposes, these are applications which ignore their own state chain, but are actually included in the system-wide one.

In this respect, in FIG. 1, crossed-out signatures correspond to standalone timestamps; their dashed connections to states show system-state updates, which the originating applications ignore.

6) An unambiguous sorting/assignment strategy implemented by the server, assigning (i.e., forwarding, step S14) requests to signers and encoding (step S16) the assignment (i.e., $a_i$, $b_i$, $c_i$, or corresponding data) into the update of the system state $s_n$. As discussed earlier, the status update can or can not include the signed timestamps $A_i$, $B_i$, $C_i$, depending on system requirements. If timestamps are not included, the status update can happen in parallel with signing, improving efficiency of the process.

Figure 4:
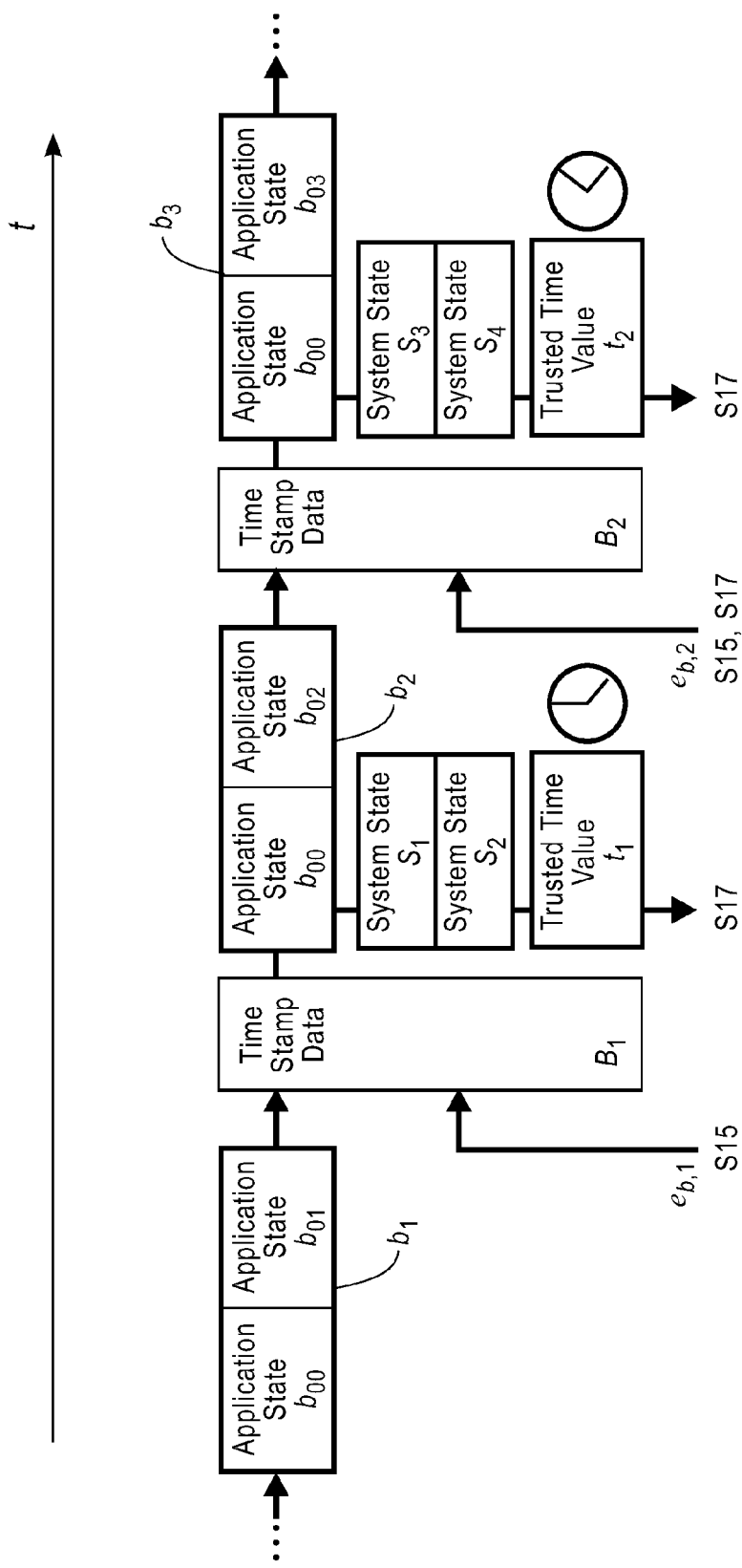
FIG. 4 illustrates a typical application view of a timestamp sequence, as obtained according to an embodiment of the present invention.

7) A public interface which transforms an event such as a hash value (for example event $e_{b,1}$, related to application state $b_1 = \{b_{00}, b_{01}\}$ of application B, see FIG. 4), and optionally the application-level state itself ($b_1 \equiv \{b_{00}, b_{01}\}$) into a signed timestamp structure advancing the application state if present (into $b_2 \equiv \{b_{00}, b_{02}\}$), and the system state (from $s_1$ to $s_2$) in all cases. Application-related events can be cryptographic hashes such as those of documents, or system changes which an application thinks is worthy of logging.

Thus, the same server is used to advance both the system and application states, e.g., using similar one way functions, resulting in the aggregation of b01/b02/s1/s2, etc.

If the calling application desires, it will be provided the system state before ($s_1$) and after ($s_2$) issuance of the timestamp $B_1$. In FIG. 4, $s_1$ and $s_2$ are returned to application B after advancing to $s_2$ (see also step S17 in FIG. 6).

Similarly, $s_3$ and $s_4$ are returned after advancing to $s_4$ in this example. Trusted time values $t_1$, $t_2$ can be returned as well.

Note that from the application viewpoint, the sequence of system states they see along their own state chain can not be consecutive. For example, in FIG. 1, the system state after issuance of $B_1$ (state $s_2$) differs from the initial system state $s_3$ before issuance of $B_2$ (i.e., the logical successor of $B_1$ from the application point-of-view).

The system constructed from the above components has numerous advantages, as to be discussed now.

A fixed-size, system-wide chain state 15 is stored. More specifically, "fixed-size" means a cryptographic hash represented in a fixed number of bits independent of how much data has been aggregated. The chain state 15 can typically be represented as $\{ \ldots, s_n, \{A_i, B_i, \ldots \}, s_{n+1}, \ldots \}$, reflecting the system-level chain of FIG. 1 Accordingly, the system can scale to a large number of applications, as application state belongs to application storage. This allows the system to easily tolerate application turnover with application-specific resource leaks.

Since only a fixed-size, system-wide chain state is stored, the system can scale to a large number of applications, as application state tracking is distributed. While application-level chaining values can be maintained separately, application-level state chains get merged into a single, system-level sequence 15 of states. This binding allows non-repudiation of all constituent application chains, if a system-level audit is performed.

Since only a fixed-size, system-wide chain state is stored, the system can scale to a large number of applications, as application state tracking is distributed. While application-level chaining values can be maintained separately, application-level state chains get merged into a single, system-level sequence 15 of states. This binding allows non-repudiation of all constituent application chains, if a system-level audit is performed.

Since applications can furthermore query a current system state with each timestamp, they gain corresponding capability to prove their own state, pointing back to system-level states. Such binding between applications and system is notably advantageous when multiple (mutually untrusted) applications must interact and prove punctuality/ownership. They can therefore advantageously rely on the present scheme.

Adding or removing signers is transparent to applications, as they do not directly participate in the request routing. One can for instance assume that offline administration sets up a signer (e.g., step S11 in FIG. 6), which gets inserted at the start of a full cycle (e.g., after obtaining state $s_4$ in FIG. 1). We can also assume that the system signs a "signer introduced" event as its first action, binding the introduction of new signer-resident keys to the audit chain.

To protect the system from accidental state collisions, application state can be split into an updated and a fixed state, and the application-state update process updates only the variable part: see e.g., $b_{1-3} \equiv \{b_{00}, b_{01-03}\}$ in FIG. 4, where $b_{00}$ (the fixed state) is not updated, assuming that it was centrally assigned. Yet, application prefixes can be assigned without central registry. For instance, the central dispatcher can know enough about host applications to derive a practically-unique identifier from them.

Practical systems can likely use state-derivation functions with negligible chance of collision; therefore explicit collision-prevention is of interest for systems where protection against unknown threats is also desired.

Aside from the queue-management overhead, the system can require central management of application requests, and their unambiguous dispatch to the set of active signers. Most of these operations scale with the number of signing devices, once queuing algorithms have selected the highest-priority requests. Since the number of signing devices is generally much less than the number of requesting applications, especially in high-assurance centralized environments, dispatcher operations will not add significant overhead.

Several extensions are now discussed.

Several copies of the present system can cooperate, if they are deployed in coupled systems, such as mainframe sysplexes. Such groups' signer public keys can for instance be synchronized under administrative control, and administrative timestamp cycles can periodically be introduced. Cross-signing timestamps between multiple instances allows multiple instances to monitor each other's clock skew, and alert the system when instances diverge.

If a keyed transformation, such as HMAC, is used to advance states, the system gains immunity from application-induced hash collisions, regardless of the choice of hash function. Assuming that applications do not compromise the timestamp dispatcher, a state-transformation key (STK) stored by the dispatcher is sufficiently secure for such an extension.

Advancing system state through a keyed transformation adds modest overhead, but makes it impossible for applications to predict the next system state, or to steer the system to known states. Theoretically, in a lightly loaded system, or where rogue applications can prevent others from requesting timestamp services, one can model and predict all data which gets combined to advance system state (as the system is likely built based on public data structures and algorithms only).

Assuming that rogue algorithms can select their events adaptively, that they can guess timestamps with high accuracy and get other states through queries. On the contrary, using keyed transformation, with a key controlled by the dispatcher, state changes can only be observed and influenced, but not predicted, by applications.

Note that in a typical server or shared environment, non-synchronized applications A, B, C, ... probably perturb the requests' streams sufficiently to make such state-controlling attacks impractical. In other systems, it is prudent to mandate a keyed transformation to advance state.

The security of issued timestamps is independent of the confidentiality of the STK, as the former are generated by HSM-resident signers. Therefore, the STK can reside within a host, and does not need protection within secure hardware. If an application can compromise the dispatcher, it can also otherwise disrupt the system at the infrastructure level—not cryptographically, but through denial-of-service—therefore, present embodiments are not specifically protecting against loss of the STK.

Additional implementation details are discussed in the following.

The system stores state information about the relative ordering of events outside secure signing devices, but stores high-assurance signing keys within secure hardware. As a consequence, some embodiments at least need to rely on cooperating host code to properly order events before they are sent to signers. Yet, secure hardware already relies on host cooperation for separation/tracking of host entities (processes, jobs, threads), and similar concepts which are not visible to I/O devices. Thus, present embodiments extend this dependency to a sequence of events, not just individual requests. Since signatures bind entire sequences cryptographically, a misbehaving host library will be exposed during system audits. Yet, malicious host code can still not forge signatures, therefore their timestamps' authenticated sequence, even if it can locally reorder or modify requests.

Figure 5:
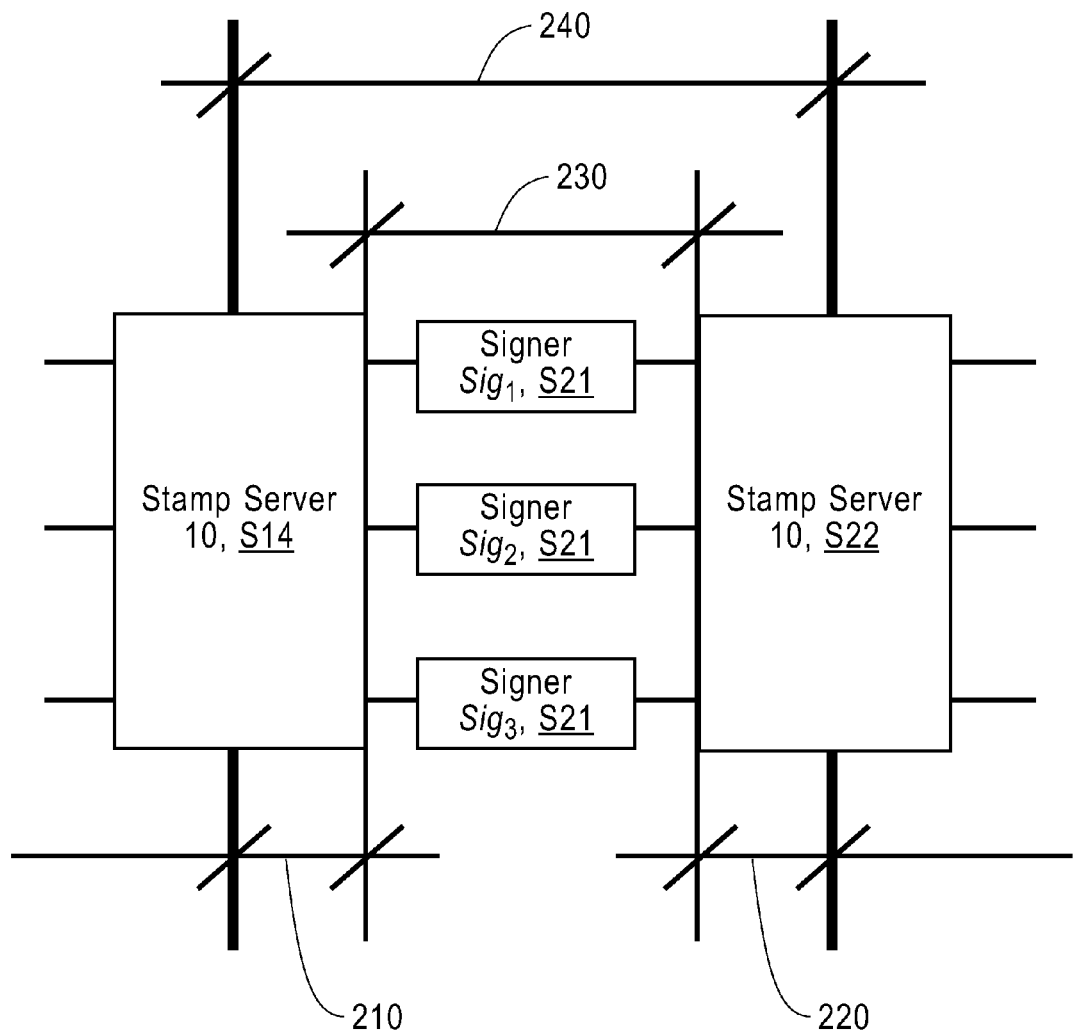
FIG. 5 illustrates time tolerance windows used by a server dispatching/receiving signatures according to an embodiment of the present invention.
Figure 6:
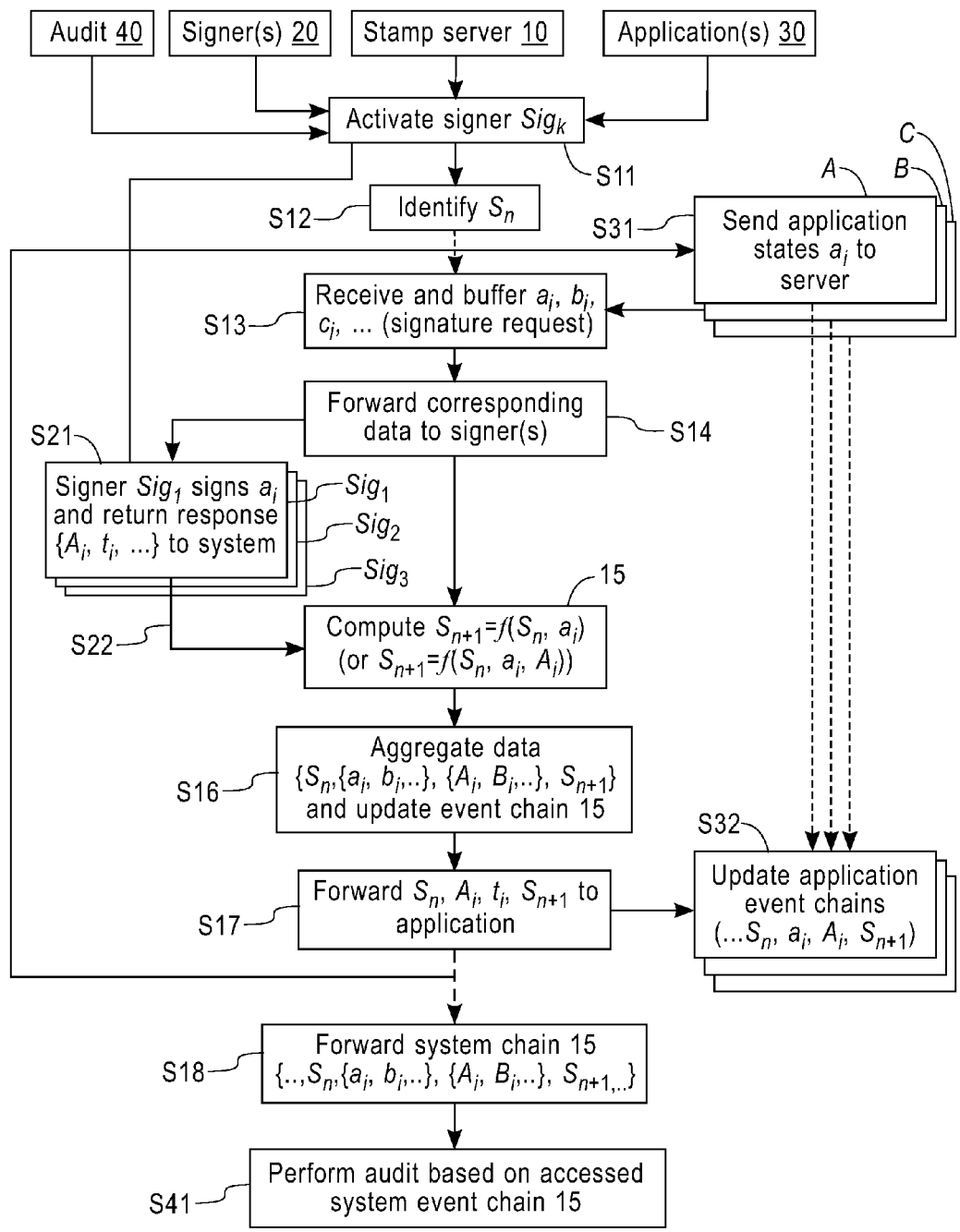
FIG. 6 illustrates a flowchart of typical steps performed by signing entities, server, and applications according to an embodiment of the present invention.

We assume that clock drift between backend signers is sufficiently small to allow the system to run without inconsistent signer-internal times. Signer clock drift can be required to remain sufficiently small such that worst-case timestamps between different signers are not contradictory. Since the system synchronizes requests, there are well-defined windows which must contain even worst-case events. In reference to FIG. 5, tolerance (time) windows 210, 220 are therefore provided on each side of a nominal timestamp window 230, the juxtaposition of window components 210, 230 and 220 amounting to the full cycle 240. In the example of FIG. 5, window 210 is for "fast signers", while window 220 is for "slow" signers:

1) Fast signers (clocks slightly ahead of proper time) must produce timestamps after the midpoint of the previous dispatch, and 2) Slow signers' timestamps must be before the midpoint of the next dispatch.

Ideally, one can synchronize signer clocks so that all timestamps contain time values from within the nominal time window, i.e., after signatures have been requested, but before they have been received by the dispatcher. Allowing divergence up to midpoints relaxes requirements somewhat, and can not be allowed in high-assurance environments, or where such relaxed treatment is not necessary.

Even with relaxed worst-case guarantees, timestamps issued in different cycles are guaranteed to be monotonic. Tight synchronization is a price to pay to guarantee relative ordering between timestamps issued in the same cycle by different signers. However, since all applications' requests are individually serialized (multiple timestamps are not issued for the same application in a same cycle), times within all application chains will be consistent by construction, due to applications requesting new timestamps only after previous ones have been processed, Since issued timestamps can be continuously monitored, an 'offending' signer (i.e., one with significant clock drift) can be taken offline, and the timestamp cycle repeated, re-issuing all requests from the failed cycle. Once offline, the drifting signer's clock can be corrected.

More generally, the server 10 receives signature requests (FIG. 6, step S13) and stores them. The server then decides when to dispatch the requests to the signers, preferably based on timing constraints, using e.g., quantized time periods, as discussed above.

Other schemes can be devised. For example, in non-preferred variants, the server waits for a given number of requests to be achieved before dispatching for signature. Still other schemes can be devised, making timing constraints not mandatory.

Embodiments relying on both time values and chaining information together with timestamps provide both wall-clock time and relative ordering capabilities. Applications can then select which evidence they prefer. Yet, only the relative ordering through a state chain provides non-repudiation evidence (and is therefore sufficient for some embodiments).

In systems where all signatures must be accounted for, such as identity document issuing applications, relative ordering and cryptographic protection against timestamp removal/insertion (both provided by the present audit chain) can be more valuable than absolute time values.

Signer utilization can be maximized if signing latency is almost uniform across signers, as a timestamp cycle time can be selected close to the worst-case value.

If the host (drivers) also monitors signer utilization, quantization can create a predictable utilization pattern the system can adopt in order to optimize processing load.

We can assume that a finite choice of signing keys can be represented in a certificate hierarchy, and applications can verify keys created by any one of eligible keys. If this assumption holds for the entire timestamp infrastructure, the system can operate without ever synchronizing keys across multiple HSMs. In such an environment, we can use "retained keys", signing keys which never leave the HSM in which they are generated.

In systems where a single backend key issues all timestamps, usual key-cloning procedures are required. They are not discussed here further; note that explicit time quantization gives us convenient points to add/remove back-ends; therefore the system effortlessly integrates with any key-synchronization solution.

Since a system according to embodiments evolves through a single, cryptographically bound set of states, state always integrates previous actions. Therefore, an audit can find a particular state as "known good", allowing periodic trimming of audit history. If the system is augmented by periodic inspections, and known good states are documented, archive logs can be bounded in size (timestamp count).

In the following, comparison is made with other secure logging systems.

A typical solution to scalability problems, especially for private-key operations, is explicit key synchronization between groups of signing keys, which then become interchangeable. Migrating keys between multiple signers in a secure manner is a challenging problem.

Present embodiments preempt the entire class of replication-related problems, by binding different signers through their shared system state. In a practical setting, we can assign signer certificates by the same controlling certificate authority 40, see FIG. 3, therefore requiring applications to locate the signing key first. However, since a similar problem occurs in signing-key replacement (when a new timestamp-server is added), it is here simply needed to point verifying applications to the solved instance.

In essence, embodiments provide scaling capability through the use of multiple independent keys rather than multiple instances of synchronized keys. The only overhead imparted on audit-verifying applications is the additional certificate parsing/verification when a previously unknown signer key is first encountered. In a high-assurance environment, this additional step (which is also cacheable) is preferable to synchronizing keys between signers.

In fact, many high-assurance signer environments prohibit export of long-lived keys; embodiments still provide a scalable solution under those rules.

Cryptographic research into secure timestamping tends to prefer cryptographically strong evolution (replacement) of signing keys, since this minimizes the vulnerability window of individual keys, see e.g. Gurevitch. Due to the inherent serialization, however, frequent key evolution also limits scalability to multiple applications. This is not a problem when one considers only a single audit chain. However, this can create serious performance bottlenecks in shared systems, such as enterprise servers.

Present embodiments use private-key signatures which allows for turning the key rollover problem into a certificate-lifecycle management, i.e., an offline problem.

The use of private key signatures is generally less efficient than symmetric-based methods, meaning less throughput for a given signer. In practice here, more signers can be accommodated for obtaining a comparable target throughput.

Currently used audit mechanisms tend to concentrate on a system-wide log, or treat application event chains as standalone entities, without aggregated logs. When the capability to handle multiple logs is mentioned, this capability generally refers to logical linking of discrete event logs, but not a system-wide aggregation of the entire past system history, see e.g. Holt at Section 9.

In the present case, embodiments of the invention are designed to integrate an unbounded number of application-level logs.

Embodiments of the system have been designed for unrestricted audits, and to store almost all of its data and all generated logs outside secure hardware (FIG. 3).

While burdening the host with a database management problem, such an approach allows for minimizing the state kept with signer hardware. Since it is not required to rely on HSM-resident logs, systems according to present embodiments can scale unlimitedly (in principle), as host resources are essentially unlimited compared to those of secure signing devices. Note that mandating internal logs presents a trivial denial-of-service attack against signing devices, see CEN at 5.1.1.3.

In case of publicly verifiable audit chains, MAC-based schemes cannot be used, leading therefore to a performance penalty compared to symmetric-based log authentication. However, since multiple signers can be accommodated, signer performance can be scaled if needed. When audit chains are signed by asymmetric techniques, audit logs provided by the system can persist eternally, with non-repudiation guarantees, unlike MAC-based methods, as in Gennaro.

As an important consequence of storing little signer-internal state, present signers can host other applications as well (assuming sufficient separation between signing keys of different users) and therefore, the present system can, in embodiments, coexist with other users of secure coprocessors. From the host perspective, coprocessors with modest unutilized capability can host the present signers. This allows the system to be added as an incremental feature to many existing systems.

Figure 7:
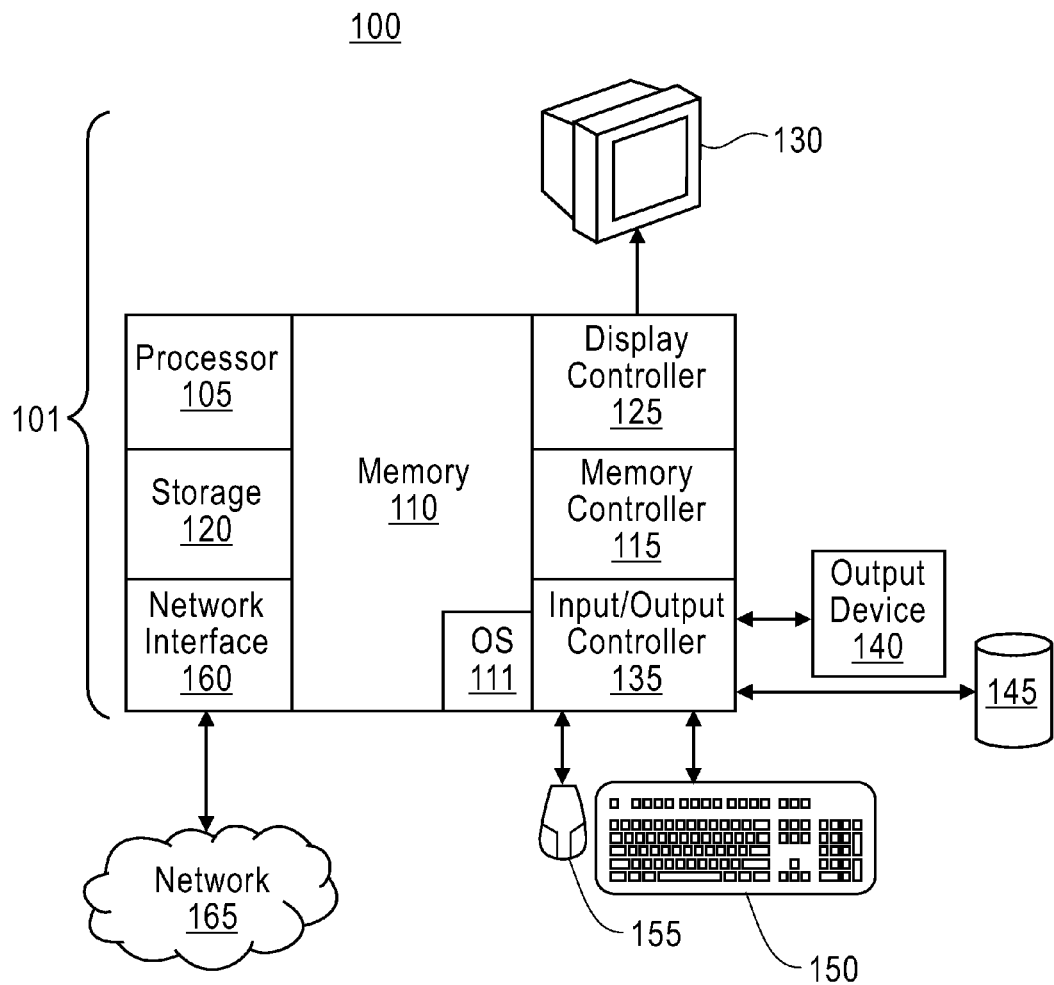
FIG. 7 illustrates an example of a computerized unit (e.g., a server computer, signer entity, or supporting executing applications) suitable for implementing steps of methods according to according to an embodiment of the present invention.

Finally, FIG. 7 illustrates an exemplary embodiment of a computerized unit suitable for implementing aspects of the present invention. It will be appreciated that the methods described herein are largely non-interactive and automated. In exemplary embodiments, the methods described herein can be implemented either in an interactive, partly-interactive or non-interactive system.

The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 100 therefore includes general-purpose computer 101.

In exemplary embodiments, in terms of hardware architecture, as shown in FIG. 7, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, but is not limited to, one or more buses or other wired or wireless connections, as is known in the art. The input/output controller 135 can have additional elements, which are omitted for simplicity, such as controllers, buffers (caches), drivers, repeaters, and receivers, to enable communications. Further, the local interface can include address, control, and/or data connections to enable appropriate communications among the aforementioned components. As described herein the I/O devices 140, 145 can be any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 can incorporate electronic, magnetic, optical, and/or other types of storage media. Note that the memory 110 can have a distributed architecture, where various components are situated remote from one another, but can be accessed by the processor 105.

The software in memory 110 can include one or more separate programs, each of which comprises an ordered listing of executable instructions for implementing logical functions. In the example of FIG. 7, the software in the memory 110 includes methods described herein in accordance with exemplary embodiments and a suitable operating system (OS) 111. The OS 111 essentially controls the execution of other computer programs, such as the methods as described herein, and provides scheduling, input-output control, file and data management, memory management, and communication control and related services.

The methods described herein can be in the form of a source program, executable program (object code), script, or any other entity comprising a set of instructions to be performed. When in a source program form, then the program needs to be translated via a compiler, assembler, interpreter, or the like, which can or can not be included within the memory 110, so as to operate properly in connection with the OS 111.

Furthermore, the methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 140, 145 can include input devices, for example but not limited to a printer, a scanner, microphone, and the like.

Finally, the I/O devices 140, 145 can further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. As described herein the I/O devices 140, 145 can be any generalized cryptographic card or smart card known in the art. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems.

In exemplary embodiments, network 165 can be a managed IP network administered by a service provider. The network 165 can be implemented in a wireless fashion, e.g., using wireless protocols and technologies, such as WiFi, WiMax, etc. The network 165 can also be a packet-switched network such as a local area network, wide area network, Internet network, or other type of network environment.

The network 165 can be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 can further include a basic input output system (BIOS) (omitted for simplicity). The BIOS is stored in ROM so that the BIOS can be executed when the computer 101 is activated.

When the computer 101 is in operation, the processor 105 is configured to execute software stored within the memory 110, to communicate data to and from the memory 110, and to generally control operations of the computer 101 pursuant to the software. The methods described herein and the OS 111, in whole or in part are read by the processor 105, perhaps buffered within the processor 105, and then executed.

When the systems and methods described herein are implemented in software, as is shown in FIG. 7, the methods can be stored on any computer readable medium, such as storage 120, for use by or in connection with any computer related system or method.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium.

A computer readable storage medium can be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electro-magnetic, optical, or any suitable combination thereof.

A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wire-line, optical fiber cable, RF, etc., or any suitable combination of the foregoing.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages.

The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams can be implemented by computer program instructions.

These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which comprises one or more executable instructions for implementing the specified logical function(s). It should also be noted that, in some alternative implementations, the functions noted in the blocks can occur out of the order noted in the figures.

For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the present invention has been described with reference to certain embodiments, it will be understood by those skilled in the art that various changes can be made and equivalents can be substituted without departing from the scope of the present invention. In addition, many modifications can be made to adapt a particular situation to the teachings of the present invention without departing from its scope.

Therefore, it is intended that the present invention not be limited to the particular embodiment disclosed, but that the present invention will include all embodiments falling within the scope of the appended claims. For example, various dispatching schemes can be relied upon, based on time constraints or critical numbers of received requests. Also, various structures can be contemplated for an updated system state, scalar, vector, or matrix, etc. In addition, while a function "$f$" has been referred to for what concerns the computation of an updated state, it is clear that algorithms can be used in order to achieve an updated system state which do not explicitly rely on a particular function but, e.g., on a series of steps, etc.

What is claimed is:

1. A computerized system comprising a server adapted for communicating with applications and signing entities, the server comprising the following computer hardware modules:

a receiving module for receiving at least one signature request issued by at least one of the applications;

a forwarding module for forwarding a first data corresponding to the received at least one signature request to at least one signing entity for subsequent signature of the first data; and a storing module for storing an updated system state that is computed using a function of: i) a reference system state and ii) a second data corresponding to the received at least one signature request, wherein the reference system state and the updated system state attest to the at least one signature request.

* * * * *